United States Patent [19]

Samson

[11] Patent Number: 5,287,408
[45] Date of Patent: Feb. 15, 1994

[54] APPARATUS AND METHOD FOR SERIALIZING AND VALIDATING COPIES OF COMPUTER SOFTWARE

[75] Inventor: Peter R. Samson, San Francisco, Calif.

[73] Assignee: Autodesk, Inc., Sausalito, Calif.

[21] Appl. No.: 938,278

[22] Filed: Aug. 31, 1992

[51] Int. Cl.⁵ .............................................. H04L 9/00
[52] U.S. Cl. .......................................... 380/4; 380/25
[58] Field of Search .............................. 380/4, 24, 25

[56] References Cited

U.S. PATENT DOCUMENTS

4,652,990   3/1987   Pailen et al. ............................ 380/4

*Primary Examiner*—David C. Cain
*Attorney, Agent, or Firm*—Blakely, Sokoloff, Taylor & Zafman

[57] ABSTRACT

An apparatus and method of disabling an unauthorized copy of a computer program. A set of numbers having an uncommon mathematical property is defined. For authorized copies, one of these numbers is written to a pre-determined location in the computer program. Whenever a copy of the computer program is attempted to be run, the computer system is instructed by the computer program to check the number at that pre-determined location. A determination is then made as to whether that number has the uncommon mathematical property. The computer program is disabled if its number at that location does not have the uncommon mathematical property.

23 Claims, 6 Drawing Sheets

APPARATUS AND METHOD FOR SERIALIZING AND VALIDATING COPIES OF COMPUTER SOFTWARE

FIELD OF THE INVENTION

The present invention pertains to the field of computer software. More particularly, the present invention relates to an apparatus and method for safeguarding computer software from being illicitly copied.

BACKGROUND OF THE INVENTION

Ever since their inception, computers have virtually exploded upon the work place. One part of their appeal and commercial success is attributable to the computers' great versatility. Often, the same computer can be programmed to perform various functions. This ability stems from the fact that a given computer can run a wide range of different types of software applications. Computer software, more commonly known as computer programs, are sets of instructions which direct the computer hardware (i.e., the physical components) to perform certain desired functions. Some common examples of software applications include data processing, word processing/desktop publishing, computer-aided design/drafting, games, etc. Indeed, a stand-alone computer without any software is virtually useless.

Creating a computer program typically involves expending a great deal of time, effort, and resources to write the lines of "code" (i.e., instructions) for achieving the desired results. In addition, most computer programs involve a great deal of creativity. Moreover, before a computer program is marketed, the program is subjected to extensive "debugging" to ensure that it operates properly under almost every scenario. Debugging a computer program is extremely time consuming and labor intensive.

Furthermore, due to major advances in semiconductor technology, computers are becoming faster and have increased processing capabilities. To take advantage of the improvements in the computer hardware, programmers are designing ever more complex and sophisticated software which offer more features to the computer user. These complex and sophisticated computer programs take correspondingly more time, effort, and resources to develop and debug. Consequently, the finished product is quite valuable commercially. However, duplicate copies can cheaply be made from the original finished product.

Duplicates are relatively easy to make. It is basically a two step process. First, the computer program is down-loaded onto a computer system, usually by reading it from a magnetic disk. Next, the program is written onto a different disk (or even potentially onto the same disk or onto a different media, such as tape), thereby creating a duplicate copy.

Because computer programs can so easily be duplicated, there is a major problem for software developers in that "pirates" who obtain a copy of a computer program, illegally duplicate the copy. These illicit duplicates are given away or sold at a lower cost than the developer's products. This illegal practice directly results in vast amounts of lost revenue for the software developers.

In response, software developers have instigated various software protection mechanisms to prevent their programs from being copied, so that illicit copies do not operate correctly. However, one disadvantage with typical prior art software protection mechanisms is that they tend to be relatively easy to "crack." In other words, pirates find ways to bypass the protection mechanisms.

Another disadvantage is that, it is often at times more convenient for the software developers, rather than making the duplicates themselves, to have the duplicates made further down the distribution chain (e.g., by one of their distributors, dealers, or vendors). If so, this entails disclosing the developer's closely guarded protection mechanism to one or more third parties to enable them to duplicate the software. Persons outside the software development company would know how to bypass that particular protection mechanism, thereby creating security problems.

Another drawback associated with having third parties produce duplicates is that it is difficult to verify the number of duplicates made by the third parties. It is hard for the developers to accurately determine how many duplicates were made and to ensure that they receive a license fee for each duplicate that was made and sold. Similar problems exist for the developers whose products are used to facilitate the development of computer programs and for developers supplying software components which are used in the computer programs of others. Deserved licensing fees might be lost due to the difficulty of accounting for the numbers of times their products were used or implemented by others.

Another disadvantage with typical prior art software protection mechanisms is that they fail to provide for contingencies, wherein multiple terminals on a computer network communicate with one another to accomplish a specific task by running the same computer program. Software developers lose revenue due to lost sales if, rather than purchasing a copy for each of the terminals, a single copy of the computer program is used to individually load each of the multiple terminals.

One prior art method for safeguarding software involves encoding individual serial numbers in each of the legitimate duplicates. A record is then kept, which tracks each of the legitimate duplicates according to their serial numbers. Thereby, if a pirated copy is found, it can be tracked back to its source by means of its encoded serial number. However, this type of software protection suffers from the fact that once a pirate locates the serial number, the pirate can replace it with a totally spurious serial number. The pirate can then make counterfeit copies utilizing the spurious serial numbers. As a result, the counterfeit copies cannot be traced back by their spurious serial numbers.

Thus, what is needed is an apparatus and method for safeguarding computer software from unauthorized copying. In particular, an apparatus and method is needed to track the source of a particular copy, and to verify the number of duplicates made by a licensed third party. It would also be highly preferable for the apparatus and method to prevent a single copy from being simultaneously loaded onto multiple terminals of a computer network based on that single copy.

SUMMARY AND OBJECTS OF THE INVENTION

In view of the problems associated with unauthorized copying of computer programs, one object of the present invention is to disable computer programs which were illicitly copied.

Another object of the present invention is to allow a particular copy of a computer program to be traced to its source.

Another object of the present invention is to allow computer programs to be duplicated anywhere in the distribution chain.

Another object of the present invention is to verify the number of duplicates made by third parties.

Yet another object of the present invention is to limit the number of programs that can be simultaneously run on a computer network to the number of authorized copies.

These and other objects of the present invention are implemented in computer programs. A dedicated computer program, which is kept-in-house and proprietary by the software developer, is used to generate a particular set of license numbers. These license numbers all share one uncommon mathematical property. Without knowing the generating scheme, it is extremely difficult for unauthorized parties to generate these numbers. A separate program embeds the license numbers into valid copies of the computer program. For each valid copy, a license number is embedded at a particular location within the computer program. The computer program also includes a section for verifying its license number. Hence, when a program is attempted to be run, the validation procedure verifies the license number. If the license number does not have the uncommon mathematical property, an error message is generated and the program exits.

In the present invention, the duplication process can occur at any point in the distribution chain. A third party is provided with a master copy of the computer program having specific locations where a license number is to be written to. A copy of the program for embedding license numbers is also provided, along with a disk containing a file which holds a number of license numbers. The number of license numbers supplied in the file may depend on the licensing fees that have been paid. For each licensed duplicate, one license number is provided in the file.

Furthermore, the present invention can be applied to computer networks to limit the number of programs that can simultaneously run to the number of authorized copies. When a program is first installed on the computer network, the program verifies its own license number, as described above. In addition, it also checks for the copies running on the computer network. If one is found, the program presents its license number to the other program for verification and also compares the license numbers of both programs. If a license number is invalid or if both license numbers are identical, an error message is generated and the first program exits.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for safeguarding computer software is described. In the following description, for the purposes of explanation, numerous specific details such as mathematical formulas, licensing numbers, flowcharts, files, etc. are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OVERVIEW OF A COMPUTER SYSTEM UPON WHICH THE PREFERRED EMBODIMENT MAY BE PRACTICED

Figure 1:
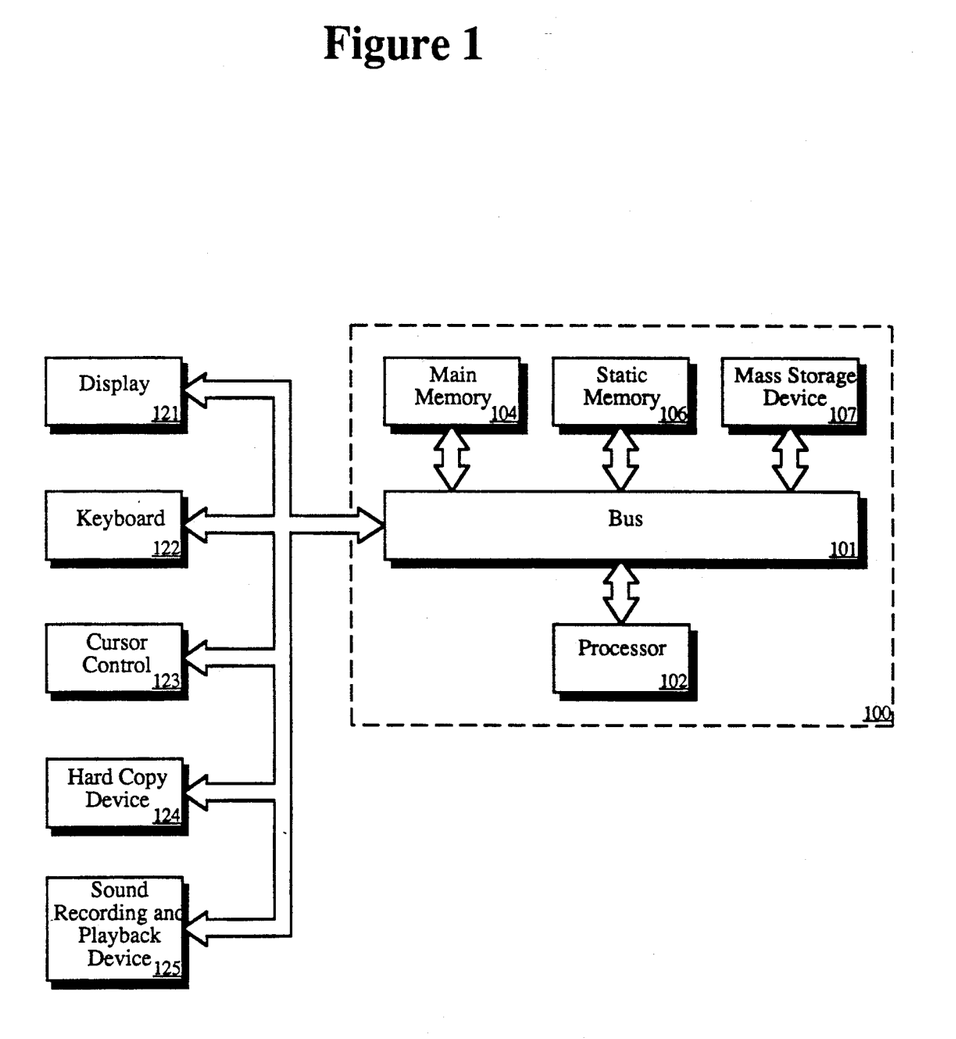
FIG. 1 is a block diagram illustrating a computer system upon which the preferred embodiment of the present invention may be practiced.

Referring to FIG. 1, the computer system upon which the preferred embodiment of the present invention is implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. Computer system 100 may further be coupled to a display device 121, such as a cathode ray tube (CRT) coupled to bus 101 for displaying information to a computer user. An alphanumeric input device 122, including alphanumeric and other keys, may also be coupled to bus 101 for communicating information and command selections to processor 102. An additional user input device is cursor control 123, such as a mouse, a trackball, or cursor direction keys, coupled to bus 101 for communicating direction information and command selections to processor 102, and for controlling cursor movement on display 121. This input device typically has two degrees of freedom in two axes, a first axis (e.g. x) and a second axis (e.g. y), which allows the device to specify any position in a plane. Another device which may be coupled to bus 101 is hard copy device 124 which may be used for printing instructions, data, or other information on a medium such as paper, film, or similar types of media. Lastly, computer system 100 may be coupled to a device for sound recording and/or playback 125 such an audio digitizer means coupled to a microphone for recording information. Further, the device may include a speaker which is coupled to a digital to analog (D/A) converter for playing back the digitized sounds.

The currently preferred embodiment of the present invention involves the serialization, personalization, and validation of a computer program. Serialization comprises the process of assigning a distinct identification number, known as a serial number, to each physical copy of the computer program. Physical copies include magnetic tape, 5¼" floppy disks, 3¼" diskettes, various optical disks, nonvolatile semiconductor memory devices, and various other types of media used to store digital bits of data which can be read by a computer. The serial number is in the form of xxx-yyyyyyy, wherein xxx correlates to a product designation and yyyyyyy correlates to a serial account for that particular product. The serial number is stamped or otherwise displayed on the box containing the physical copy of the program and on the license agreement or registration card also enclosed in the box. In addition, a form of the serial number is encoded in the computer program, as will be discussed in detail below. The serial number is used by order entry, MIS, shipping, etc. to track the product.

In the present invention, the license number is created with the knowledge of a proprietary number x. The reason for keeping x proprietary is to make it extremely difficult for unauthorized parties from creating valid license numbers. In the currently preferred embodiment, the license number is comprised of 48 hexadecimal digits. A license number is comprised of a set of three 64-bit numbers (i.e., approximately 19 decimal digits each). License numbers are based on a mathematical "one-way trapdoor" function, whereby license numbers can readily be generated knowing the generating scheme but are hard to generate knowing only the testing scheme for verifying the validity of a license number. These types of functions are typically associated with public-key cryptography and digital signature applications.

Figure 2:
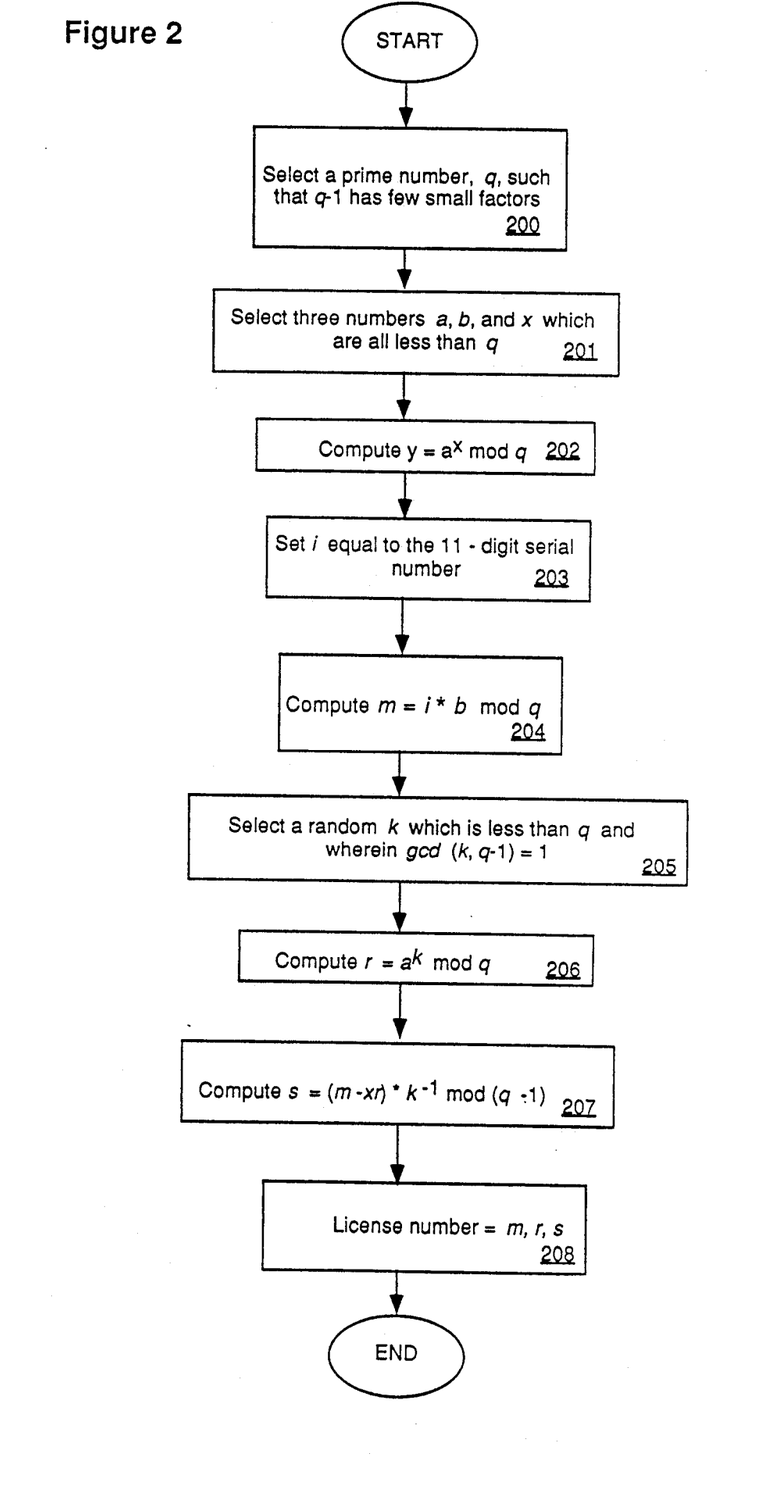
FIG. 2 is a flowchart illustrating the steps for generating a valid license number.

FIG. 2 is a flowchart illustrating the steps for generating a valid license number. First, a prime number, q, is selected preferably such that $q-1$ has few small factors, step 200. Next, three numbers, a, b, and x which are all less than q are selected, step 201. Once the number, x, has been selected, it is kept confidential by the software developer and is used to generate future license numbers. The number, y, is computed from the equation $y = a^x \mod q$, step 202. The number, i, is set equal to the 11-digit serial number, step 203. The number, m, is computed from the equation $m = (i*b) \mod q$, step 204. A random number, k, is selected such that k is less than q and wherein the greatest common divisor of k and $q-1$ equals 1, step 205. The number, r, is computed from the equation $r = a^k \mod q$, step 206. Based on Fermat's theorem, $m = x*r + k*s \mod (q-1)$, the value for s can be determined. The value, s, is computed from the equation $s = (m - x*r)*k^{-1} \mod (q-1)$, step 207. The inverse of k (i.e., $k^{-1}$) is defined as the number which, when multiplied by k mod q, yields 1. The license number is equivalent to m, r, and s, step 208.

A simplified example illustrating how to generate a license number is now offered. A prime number, 11, is selected as q. Likewise, the numbers 3, 6, and 7 are respectively selected for the values of a, b, and x. The value of y equals $a^x \mod q = 3^7 \mod 11 = 9$. Given a serial number of 4, the value of i is set to that number. The value of m equals $i*b \mod q = 4*6 \mod 11 = 2$. The value k is chosen to be 5. A value for r is computed to be $a^k \mod q = 3^5 \mod 11 = 1$. Next, the value for s is computed to be $(m - xr) * k^{-1} \mod (q-1) = (2-7.1)*9 \mod 100 = 5$. Therefore, the generation process yields a license number of m, r, $s = 2, 1, 5$.

Note that the encryption algorithm can be applied to numbers greater than 64-bits. By implementing larger numbers, it becomes more difficult for unauthorized third parties to randomly determine valid license numbers on a trial by error process. For a 64-bit implementation, the odds are approximately one in $1.8 * 10^{19}$ that a random number happens to result in a valid license number. The odds become even greater against randomly determining a valid license number for implementations utilizing more than 64 bits.

Consequently, consistent generation of valid license numbers requires knowledge of the 64-bit parameter, x, which is kept confidential by the software developer. In the currently preferred embodiment, the value of x is specific to a given software product. In other words, each software product is assigned a unique x value, from which license numbers are derived and enclosed within the duplicates of that product to be sold. In this manner, valid license numbers for one product are invalid for other products. Thus, if an unauthorized party determines the value of x for one product, only that one product is compromised. Other products, encoded with license numbers generated from different x values, remain secure.

The currently preferred embodiment also includes a personalization process. The personalization process is implemented during installation of a computer program to associate the name of an individual user with a copy of the program. Similarly, the user's organization can also be associated with the copy. This information is entered by the user and is written into the computer program. It should be noted that personalization is an added feature and is not critical to the implementation of the present invention.

Each copy of the computer program includes a verification procedure. Depending on the specific situation, the verification procedure could be invoked once at startup, repeatedly in an event loop, or in some vital subroutine or function. The verification procedure first verifies that the license number corresponds to the serial number. Next, it verifies the license number to determine whether it is valid. The validation process also entails checking the node ID, if applicable. If these verification tests are passed, other parts of the computer program are initialized. Otherwise, the computer program is left in a non-runnable state and then exits.

Figure 3:
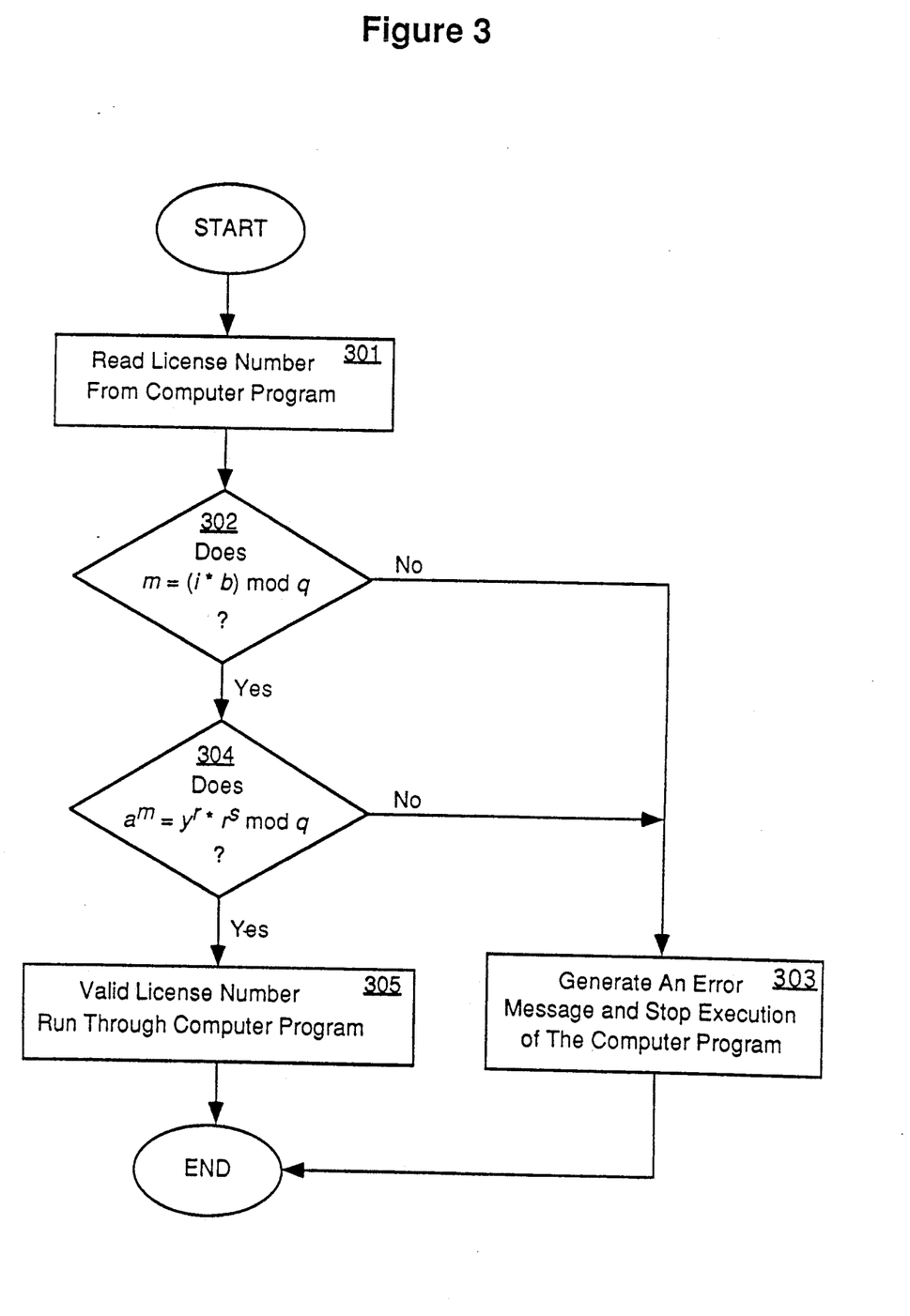
FIG. 3 is a flowchart illustrating the steps for verifying a license number.

FIG. 3 is a flowchart illustrating the license number verification procedure. The license number is read from the computer program, step 301. A determination is made as to whether $m = i * b \mod q$, step 302. If m does not equal $(i * b) \mod q$, an error message is generated and execution of the computer program is halted, step 303. Otherwise, a determination is made as to whether $a^m = y^r * r^s \mod q$, step 304. If so, this indicates that the license number is valid, and the computer program is run, step 305. If $a^m$ is not equal to $y^r * r^s \mod q$, an error message is generated and execution of the computer program is halted, step 303.

As an example of the verification process, the valid license number (i.e., $m=2$, $r=1$, and $s=5$) generated in the previous example will now be verified. The value of $(i*b) \mod q = (4 * 6) \mod 11 = 2$ is equivalent to the value of $m=2$. The value of $y^r * r^s \mod q = 9^1 * 1^5 \mod 11 = 9$ is equivalent to the value of $a^m = 3^2 = 9$. Hence, the license number "2, 1, 5" is valid.

This validation procedure is included as part of the computer program. Note that an unauthorized party can determine how to verify license numbers by examining the computer program. Nonetheless, this knowledge does not disclose how to generate other valid license numbers. The reason is because the parameter, x, is not present in the code. Generating other valid license numbers remains quite difficult without knowing the value of x. Moreover, the verification procedure can be safeguarded by standard security techniques.

In an alternative embodiment, the present invention is applied to computer programs running on computer network systems, such as a local area network (LAN) wherein several terminals (e.g., personal computers, workstations, etc.) are coupled together and can communicate with one another. Again, as in the case for stand-alone programs, an authorization code is embedded within the computer program to be installed on the network. However, the verification procedure is made part of or is called from that part of the program which sets up a network connection. In addition to verifying its own license number, further steps are included as part of the network verification procedure. Whenever the computer program is first installed on the network, the program looks on the network for other running copies of itself. If one is found, the program presents its license number to the other program for verification. Next, the license numbers of the two programs are compared. If the programs have identical license numbers, it indicates either that one of the programs was illicitly copied or that the same physical copy was used to load different terminals. An error message is generated and the program exits.

In an alternative embodiment, rather than having each copy containing just a single distinct license number, there can be up to z different license numbers incorporated within a single copy. In this manner, up to z instances of the program can be run simultaneously on the computer network from that sole copy, and the software developer would receive a licensing fee for each of the z instances. For example, if a copy contains 10 different license numbers, up to 10 instances of it can be run simultaneously on the computer network. Similarly, a single copy containing a set of valid license numbers can reside on a server. If, during network connection one of the license numbers is rejected, the other license numbers can be successively verified until one is accepted. If none are acceptable, the program generates an error message an exits. Note that once a program has been enrolled in the network, further correspondence on the network can be made by using just the first part of its license number, corresponding to the number m above, as "m" is unique due to the method of generation. This increases the verification efficiency.

In another alternative embodiment, the present invention is used in conjunction with hardware implementations, known as "dongles," used to safeguard against unauthorized copying. Typically, a dongle is a physical device which is provided along with the software. It plugs into a port in the back of a computer. Each time the software is initialized, it interrogates that port to verify that its proprietary dongle is plugged in. This scheme necessitates an unauthorized party not only to copy the software and to bypass any software safeguards but also to duplicate and supply a dongle as well. The method for applying the present invention to dongles is to embed authorization codes within the dongles. When the dongle is interrogated, the computer program also checks to determine whether the dongle contains a valid authorization code. If the dongle had been illicitly copied, it can be traced back to its source by reading its authorization code.

Similarly, the license number can be embedded in a computer system's hardware. For example, the license number could reside within the computer's Erasable Programmable Read Only Memory (EPROM). The computer program reads this license number from the EPROM and performs the verification procedure on it.

Figure 4:
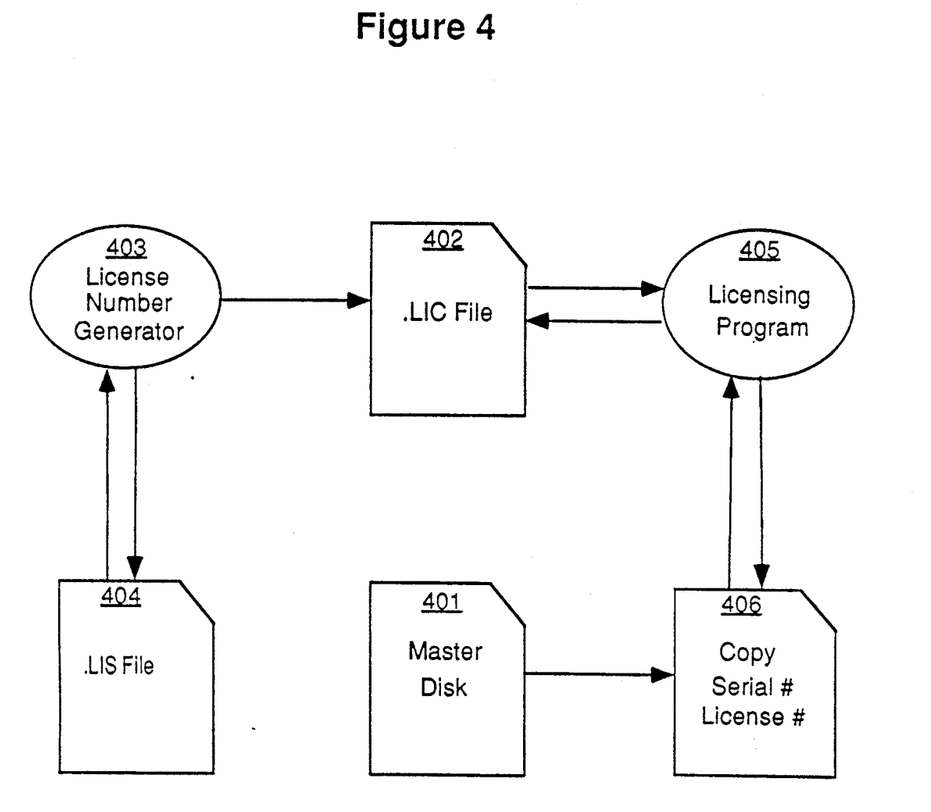
FIG. 4 illustrates a duplication process of the currently preferred embodiment of the present invention.

The currently preferred embodiment of the present invention provides a flexible method of distributing licensed software. Referring to FIG. 4, which illustrates the duplication process, a master copy 401 of the licensed software is provided and is accompanied by a set of valid license numbers contained in .LIC file 402. A licensing program 405 is also provided to embed the license numbers in the duplicates.

A .LIC file contains a number of distinct license numbers. Each license number is accompanied by its corresponding serial number. The name of the .LIC file denotes its final serial number, along with a "generation" number. The generation number is incremented each time the .LIC file is split for sublicensing. Hence, the generation number specifies how many times that particular .LIC file had been split.

The .LIC file is comprised of a text format, which can be viewed by using a text editor to display the number of license numbers remaining, the audit trail, etc. In the currently preferred embodiment, a set of stickers are provided along with the .LIC file. Each sticker bears a hologram and a unique serial number. The stickers are affixed to finished software products to give tangible evidence of each license number and to discourage illicit duplication at each step of the distribution chain. The number of valid license numbers which are provided corresponds to the license fees which had been paid.

Note that there exists various methods of distributing valid license numbers to be embedded. Some examples include: removable storage medium (e.g., floppy disks), in writing, verbally, by electronic transmission, etc. The actual duplication process whereby copies of the master program 401 are manufactured to be sold as finished applications can occur at any point of the distribution link: by the software developer, a third-party developer, a distributor, or even an end user. If there are several stages of distributors or dealers involved, the embedding can be done at any stage. Likewise, if successive stages of enhancement are to be done by several different parties, then either the licensing number(s) and the licensing program can be handed down from one party to the next or they can be given directly to the last party.

If the software product is intended to be a component in a larger product, such as a library used by third-party developers to build application programs, a .LIC file and a licensing program can be provided to whoever is to make the final products. That party can then embed the license numbers into the finished products. At the end of each step of the distribution link, the authority to duplicate the computer program, embodied by a set of valid license numbers, can be applied to the finished products, passed to the next step, or subdivided. The software developer can answer subsequent requests for further licensed copies of the computer program by providing additional valid license numbers.

Valid license numbers are generated by a computer program 403 which creates the .LIC files. This license number generating program 403 is kept in-house by the software developer. In addition to generating license numbers, the program also updates an .LIS data file 404. The .LIS data file 404 contains a log of assigned ranges of serial numbers, thereby providing an audit trail.

Figure 5:
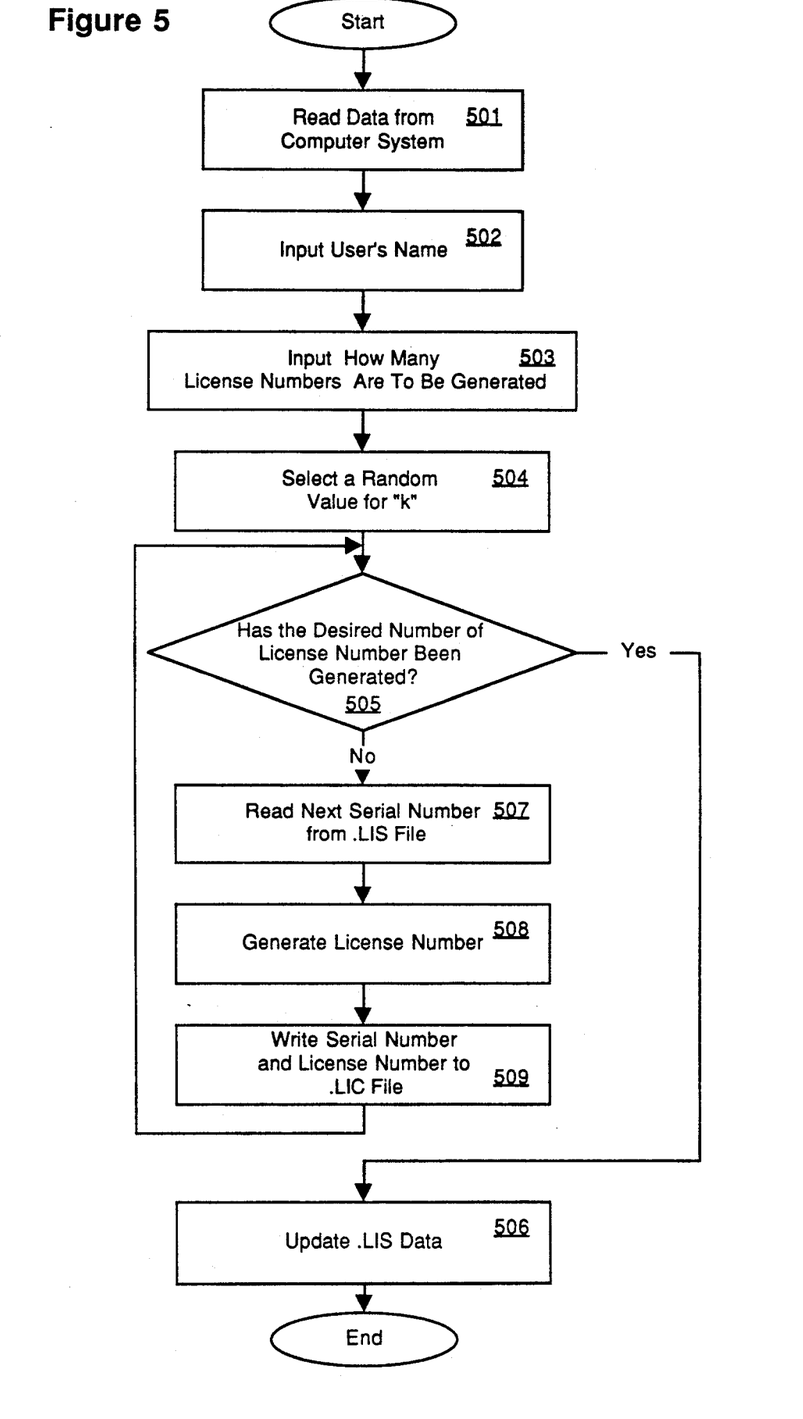
FIG. 5 is a flowchart illustrating the steps of the license number generating program.

FIG. 5 is a flowchart illustrating the steps of the license number generating program. When the program is initialized, it reads the date from the computer system, step 501. Next, the program prompts for the user's name, step 502, and for how many license numbers are to be generated, step 503. A pseudo-random value, based in part on the date and the user's name, is selected for "k", step 504. A determination is made as to whether the inputted number of license numbers has been generated, step 505. If so, the .LIS file is updated, step 506. Otherwise, the next serial number is read from the .LIS file, step 507. The license number is generated based on the serial number, and the values of "k" and "x", step 508. The serial number and license number are written to the .LIC file, step 509. Step 505 is then repeated.

Referring back to FIG. 4, a stand-alone licensing program 405 is distributed along with .LIC file 402. Licensing program 405, which processes the .LIC file 402, is also used to write authorization codes onto the finished copies 406 of the computer program. This is accomplished by reading .LIC file 402 and extracting one or more license numbers. Licensing program 405 then either puts the extracted license numbers in a new, smaller .LIC file by splitting one file into two and assigning an encoded name to the new file or puts the extracted license numbers in the binary file of the copies 406. As license numbers are taken from LIC file 402, they are marked off as being "used".

Figure 6:
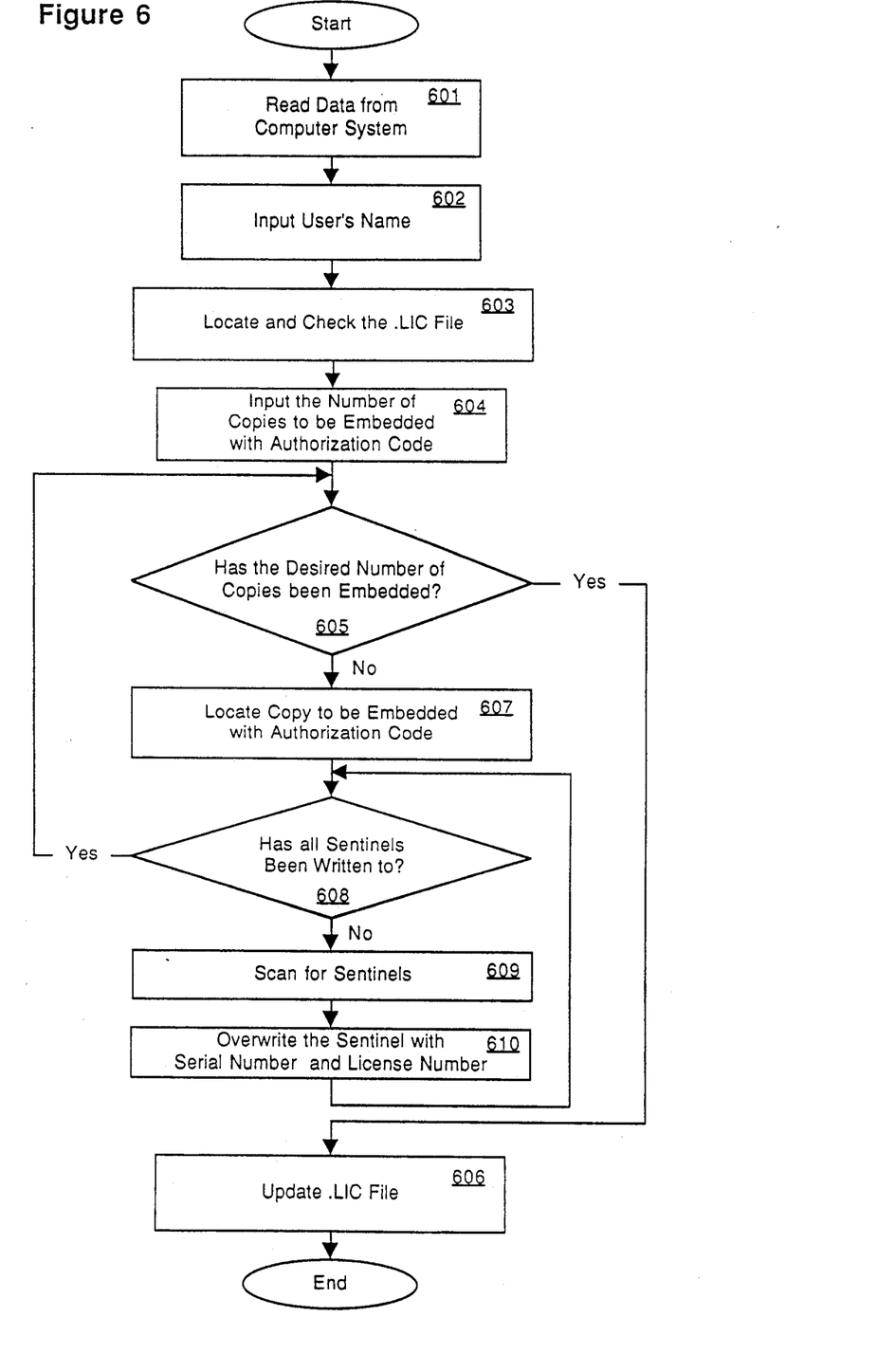
FIG. 6 is a flowchart illustrating the steps performed by the licensing program.

FIG. 6 is a flowchart illustrating the functions performed by the licensing program. First, the date is read from the computer system, and the user's name is input to the computer system, step 601 and 602. Next, the .LIC file is located, and its consistency is checked, step 603. The number of copies to be embedded with an authorization code is input to the computer system by the user, step 604.

A determination is made as to whether the desired number of copies have been embedded, step 605. If so, the .LIC file is updated, step 606. Otherwise, the next copy to be embedded with an authorization code is located, step 607.

A determination is made as to whether all the locations marked by sentinels within that copy has been overwritten, step 608. A sentinel is a predetermined code within the master copy of the computer program which marks the place where the serial and license numbers can safely be written. In other words, in copies of the master program, either the original sentinel codes are overwritten by the serial and license numbers, or the serial and license numbers are written at locations which are fixed in relation to the locations of the sentinels, to permit the sentinels to be found again and additional serial and license numbers to be written. More than one sentinel can be incorporated within a single copy. In the currently preferred embodiment, at least two sentinels are implemented for a serial number and a license number. The licensing program does check to verify that the master copy contains the correct number and types of sentinels. If the licensing program notes a discrepancy, it generates an error message and exits. Steps 609 and 610 are repeated until all the sentinels have been properly overwritten. Once all sentinels have been overwritten, step 605 is repeated.

The licensing program also includes a text string comprising an "audit entry". This text string is used to identify who is processing the .LIC file. Successive audit entries are concatenated in the new .LIC file to form an "audit trail". This audit trail is in addition to the valid license numbers in the .LIC file.

What is claimed is:

1. A method of disabling an unauthorized copy of a computer program comprising the steps of:
   defining a set of numbers which are generated according to a first mathematical function and which can be validated by a second mathematical function;
   specifying a location of said computer program wherein one number of said set of numbers is written to said location in an authorized copy of said computer program;
   reading a number from a copy of said computer program at said location;
   determining whether said read number is valid according to said second mathematical function;
   disabling said copy if said read number is not valid.

2. The method of claim 1, wherein one of said set of numbers is generated comprising the steps of:
   selecting a prime number, q, and three numbers a, b, and x which are less than q;
   selecting a number, k, which is less than q, wherein the greatest common divisor of k and (q−1) equals 1;
   selecting a serial number, i;
   computing a value of $m = (i*b) \bmod q$, a value of $r = a^k \bmod q$, and a value of $s = (m - x*r)*k^{-1} \bmod (q-1)$;
   outputting a number comprising said values of m, r, and s.

3. The method of claim 2, wherein a sentinel in said programming means specifies said location to be written in said authorized copy of said computer program.

4. The method of claim 3, wherein said determining step is comprised of determining whether $m \neq (i*b) \bmod q$ and $a^m \neq y^r * r^s \bmod q$.

5. The method of claim 4, wherein said reading, determining, and disabling steps are performed when said computer program is initialized.

6. The method of claim 3 further comprising the steps of: specifying a second location of said computer program where a second number, bearing a specified mathematical relationship to said first number, is written to said second location in said authorized copy of said computer program.

7. The method of claim 4, wherein said reading, determining, and disabling steps are performed in a subroutine of said computer program.

8. The method of claim 6 further comprising the step of storing data identifying a party making copies of said computer program.

9. The method of claim 4, wherein in a computer network, said method is further comprised of the steps of:
   determining whether said computer network is running a second copy of said computer program;
   comparing said read number against a number at said location in said second copy, if said computer network is running said second copy of said computer program;
   generating an error signal if said read number is identical to said number at said location in said second copy.

10. The method of claim 9 further comprising the step of writing a plurality of different numbers to said computer program to allow a plurality of instances of said computer program to be run simultaneously on said computer network.

11. An apparatus for disabling an unauthorized copy of a computer program comprising:
- a means for generating a number according to a first mathematical algorithm;
- a means for writing said number to an authorized copy of said computer program at a specified location;
- a means for reading a number at said location from a copy of said computer program;
- a testing means for determining whether said read number from said copy is valid according to a second mathematical algorithm;
- a means for disabling said computer program if said read number does not have said uncommon mathematical property.

12. The apparatus of claim 11 further comprising a means for locating a sentinel used to mark a specific location in said computer program and overwriting a location bearing a fixed relation to said sentinel with said number.

13. The apparatus of claim 12, wherein said computer program includes said testing means.

14. The apparatus of claim 13, wherein said testing means is activated when said computer program is initiated.

15. The apparatus of claim 14 further comprising a storage means for storing information regarding who is making copies of said computer program.

16. The apparatus of claim 14, wherein said writing means writes a second number to said computer program, said second number bearing a specified mathematical relationship to said first number.

17. The apparatus of claim 16, wherein said generating means is based on Fermat's equation:

$$m = xr + ks \mod (q-1).$$

18. The apparatus of claim 13, wherein said testing means comprises part of a subroutine in said computer program.

19. The apparatus of claim 13 further comprising a means for said computer program to communicate with a plurality of computers in a computer network.

20. The apparatus of claim 19, wherein said testing means is further comprised of:
- a means for determining whether a second copy of said computer program is being run in said computer network;
- a means for reading a second number from said second copy;
- a means for comparing said number read from said first copy with said second number read from said second copy;
- a means for disabling said computer program of said first copy if said first number and said second number are identical.

21. The apparatus of claim 20, wherein said writing means writes a plurality of numbers to said computer program, each of said plurality of numbers being generated according to said first mathematical algorithm.

22. An apparatus for disabling an unauthorized copy of a computer program comprising:
- a means for generating a number according to a first mathematical function;
- a means for embedding said number in a physical device;
- a means for disabling said computer program if, upon installation of said computer program onto a computer system, said physical device having said number is not coupled to said computer system.

23. The apparatus of claim 22, wherein said physical device is an EPROM.

* * * * *

UNITED STATES PATENT AND TRADEMARK OFFICE
CERTIFICATE OF CORRECTION

PATENT NO. : 5,287,408
DATED : February 15, 1995
INVENTOR(S) : Peter R. Samson

It is certified that error appears in the above-indentified patent and that said Letters Patent is hereby corrected as shown below:

Column 5, line 66: Delete "(2-7.1)"  Insert in place thereof --(2-7·1)--

Signed and Sealed this

Twenty-ninth Day of August, 1995

Attest:

BRUCE LEHMAN

Attesting Officer  Commissioner of Patents and Trademarks